US009288388B2

(12) United States Patent
Son et al.

(10) Patent No.: US 9,288,388 B2
(45) Date of Patent: Mar. 15, 2016

(54) METHOD AND PORTABLE TERMINAL FOR CORRECTING GAZE DIRECTION OF USER IN IMAGE

(71) Applicant: Samsung Electronics Co., Ltd., Gyeonggi-do (KR)

(72) Inventors: Byung-Jun Son, Seoul (KR); Sung-Dae Cho, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 96 days.

(21) Appl. No.: 13/741,991

(22) Filed: Jan. 15, 2013

(65) Prior Publication Data

US 2013/0222644 A1 Aug. 29, 2013

(30) Foreign Application Priority Data

Feb. 29, 2012 (KR) .......................... 10-2012-0021091

(51) Int. Cl.
*H04N 5/232* (2006.01)
*H04N 7/14* (2006.01)
(Continued)

(52) U.S. Cl.
CPC ............ *H04N 5/23219* (2013.01); *G06F 3/013* (2013.01); *G06K 9/00597* (2013.01); *H04N 7/144* (2013.01)

(58) Field of Classification Search
CPC .......... G06K 9/00221; G06K 9/00597; G06K 9/4671; A61B 3/113; H04N 13/0484; H04N 5/23219; H04N 2213/001; H04N 7/144; H04N 7/15; H04N 7/0042; H04N 7/147; H04N 7/157; H04N 7/142; H04N 13/0203; H04N 13/0018; H04N 13/0022; H04N 13/0239; H04N 2007/145; H04N 21/8146; H04N 21/4223; H04N 21/44008; H04N 21/4788; H04N 1/2112; H04N 1/32128; H04N 1/00127; H04N 2201/3274; H04N 2201/3204; H04N 2201/3225; H04N 19/20; G06F 3/013; G06F 3/0488; G06F 3/011; G06F 3/015; G06F 3/041; G06F 1/169; G06F 1/1626; G06F 1/1637; G06F 1/1684; G06F 1/1686; G06T 2207/10012; G06T 2207/30201; H04M 1/72544; H04M 2250/52; G02B 27/0093
USPC ............................ 348/208.12, 345–357, 239
See application file for complete search history.

(56) References Cited

U.S. PATENT DOCUMENTS 6,677,980 B1 1/2004 Jeon
8,885,882 B1 * 11/2014 Yin ........................... G06F 3/00
382/103

(Continued)

FOREIGN PATENT DOCUMENTS

JP 2000-137789 5/2000
JP 2005-117106 4/2005
(Continued)

OTHER PUBLICATIONS

Lior Wolf et al., "An Eye for an Eye: A Single Camera Gaze-Replacement Method", 2010 IEEE Conference on Computer Vision and Pattern Recognition, Jun. 13, 2010.
(Continued)

*Primary Examiner* — Pritham Prabhakher
(74) *Attorney, Agent, or Firm* — The Farrell Law Firm, P.C.

(57) ABSTRACT

A method and portable terminal are provided for correcting a gaze direction of a user in an image. A face of the user is detected in the image. Contour points of an eye area are detected in the detected face. The contour points of the detected eye area in the image are changed to contour points that correspond to a gaze direction toward a reference camera. The gaze direction of the user in the image is corrected by transforming the eye area according to the changed contour points.

18 Claims, 7 Drawing Sheets

(51) Int. Cl.
  *G06F 3/01*   (2006.01)
  *G06K 9/00*   (2006.01)

(56)  References Cited

U.S. PATENT DOCUMENTS

| | | |
|---|---|---|
| 2003/0197779 A1 | 10/2003 | Zhang et al. |
| 2004/0005083 A1* | 1/2004 | Fujimura ............... A61B 3/113 382/103 |
| 2004/0062424 A1 | 4/2004 | Mariani et al. |
| 2005/0180740 A1* | 8/2005 | Yokoyama ............ G06F 1/1626 396/421 |
| 2007/0140531 A1* | 6/2007 | Hamza ............... G06K 9/00597 382/117 |
| 2007/0242900 A1* | 10/2007 | Chen ......................... G06T 5/50 382/294 |
| 2010/0135532 A1* | 6/2010 | Nakagomi ......... G06K 9/00248 382/103 |
| 2010/0156781 A1* | 6/2010 | Fahn .................. H04M 1/72544 345/156 |
| 2010/0189358 A1* | 7/2010 | Kaneda .............. G06K 9/00744 382/195 |
| 2011/0075933 A1 | 3/2011 | Hong et al. |
| 2012/0081568 A1* | 4/2012 | Suzuki .................... G06T 19/20 348/222.1 |
| 2012/0131491 A1* | 5/2012 | Lee .......................... G06F 3/013 715/776 |
| 2013/0016102 A1* | 1/2013 | Look ....................... G06T 15/20 345/426 |
| 2013/0169530 A1* | 7/2013 | Bhaskar .................. G06F 3/012 245/157 |
| 2014/0056529 A1* | 2/2014 | Ruan .................. G06K 9/00597 382/199 |
| 2015/0084864 A1* | 3/2015 | Geiss ....................... G06F 3/033 345/158 |

FOREIGN PATENT DOCUMENTS

| | | |
|---|---|---|
| JP | 2010-239583 | 10/2010 |
| KR | 100307854 | 8/2001 |
| WO | WO 2011/030263 | 3/2011 |

OTHER PUBLICATIONS

Dorian Weiner et al., "Virtual Gaze Redirection in Face Images", Proceedings of the 12th International Conference on Image Analysis and Processing, Sep. 17, 2003.
Ben Yip, "Face and Eye Rectification in Video Conference using Artificial Neural Network", IEEE International Conference on Multimedia and Expo, Jul. 6, 2005.
Ke Sun et al., "A Composite Method to Extract Eye Contour", Jan. 1, 2005.
European Search Report dated Feb. 5, 2015 issued in counterpart application No. 13155468.5-1901.
Francis Martinez et al., "Radial Symmetry Guided Particle Filter for Robust Iris Tracking", Computer Analysis of Images and Patterns, Aug. 29, 2011, 9 pages.
European Search Report dated Jun. 11, 2015 issued in counterpart application No. 13155468.5-1901, 13 pages.
Australian Examination Report dated Dec. 3, 2015 issued in counterpart application No. 2013200807, 4 pages.

* cited by examiner

METHOD AND PORTABLE TERMINAL FOR CORRECTING GAZE DIRECTION OF USER IN IMAGE

PRIORITY

This application claims the priority under 35 U.S.C. §119 (a) to Korean Patent Application Serial No. 10-2012-0021091, which was filed in the Korean Intellectual Property Office on Feb. 29, 2012, the content of which is incorporated herein by reference.

BACKGROUND OF THE INVENTION

1. Field of the Invention

The present invention relates generally to a method for correcting an image, and more particularly, to a method for correcting a direction of a user's gaze from a display unit to a camera.

2. Description of the Related Art

In a video phone call and a video conference, due to the difference between a gaze direction of a user who stares at a camera and that of the user who stares at a display unit, a gaze direction of the user viewing the display unit may seem to be different for each position of the camera. When the camera is located in an upper left end of the display unit, a user viewing the display unit appears to gaze upon the lower right end of the display unit. When the camera is located in an upper right end of the display unit, a user viewing the display unit appears to gaze upon the lower left end of the display unit. When the camera is located in the upper middle end of the display unit, a user viewing the display unit appears to gaze upon the lower middle end of the display unit.

A gaze direction may be corrected using a comparison between two images that are input by two cameras mounted at upper and lower ends of a display unit, or at left and right ends thereof. A difference between the two images is analyzed, and an image which seems to look straight ahead (at a camera) is generated. In technologies that use a three-dimensional face model or a three-dimensional eye model, an image which looks straight ahead may be generated.

In attempts to solve the problem of gaze direction disparity, positions of the two cameras are mainly fixed. A distance between the user and each camera, and a difference between the gaze direction of the user to the display unit and that of the user to the camera are calculated. This causes the pose of the whole face to be changed, in order to solve the gaze direction disparity. In order to change the pose of the head of the user as described above, technology is required in which a face contour area must be separated from a background. A technology for automatically separating a face contour area from a background requires a significant amount or processing time, and does not have a sophisticated performance. The use of two cameras is also problematic. A portable communication terminal which enables a user to talk on the phone while the user moves, has a distance between the camera and the user and a background, which frequently changes. These factors can make it more difficult to utilize the portable communication terminal for a real-time video phone call, a mirror function, self-image capturing, etc.

SUMMARY OF THE INVENTION

The present invention has been made to address at least the above problems and/or disadvantages and to provide at least the advantages described below. Accordingly an aspect of the present invention provides a method for correcting a direction of a user's gaze from a display unit to a camera.

Also, another aspect of the present invention is to correct a gaze direction of a user in an image in real time or at high speed in all application technologies and apparatuses, where disparity in the gaze direction of the user is caused by the difference between the gaze direction of the user to a display unit and that of the user to a camera.

In accordance with an aspect of the present invention, a method is provided for correcting a gaze direction of a user in an image. A face of the user is detected in the image. Contour points of an eye area are detected in the detected face. The contour points of the detected eye area in the image are changed to contour points that correspond to a gaze direction toward a reference camera. The gaze direction of the user in the image is corrected by transforming the eye area according to the changed contour points.

In accordance with another aspect of the present invention, an article of manufacture for correcting a gaze direction of a user in an image is provided. The article of manufacture includes a non-transitory machine-readable storage medium for recording one or more programs, which when executed implement the steps of: detecting a face of the user in the image; detecting contour points of an eye area in the detected face; changing the contour points of the detected eye area in the image to contour points that correspond to a gaze direction toward a reference camera; and correcting the gaze direction of the user in the image by transforming the eye area according to the changed contour points. In accordance with a further aspect of the present invention, a portable terminal is provided for correcting a gaze direction of a user in an image. The portable terminal includes a camera for capturing an image. The portable terminal also includes a controller for detecting a face of the user in the image, detecting contour points of an eye area in the detected face, changing the contour points of the detected eye area in the image to contour points that correspond to a gaze direction toward a reference camera, and correcting the gaze direction of the user in the image by transforming the eye area according to the changed contour points. The portable terminal further includes a display unit for displaying the image into which the controller transforms the eye area.

BRIEF DESCRIPTION OF THE DRAWINGS

The above and other features, aspects, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
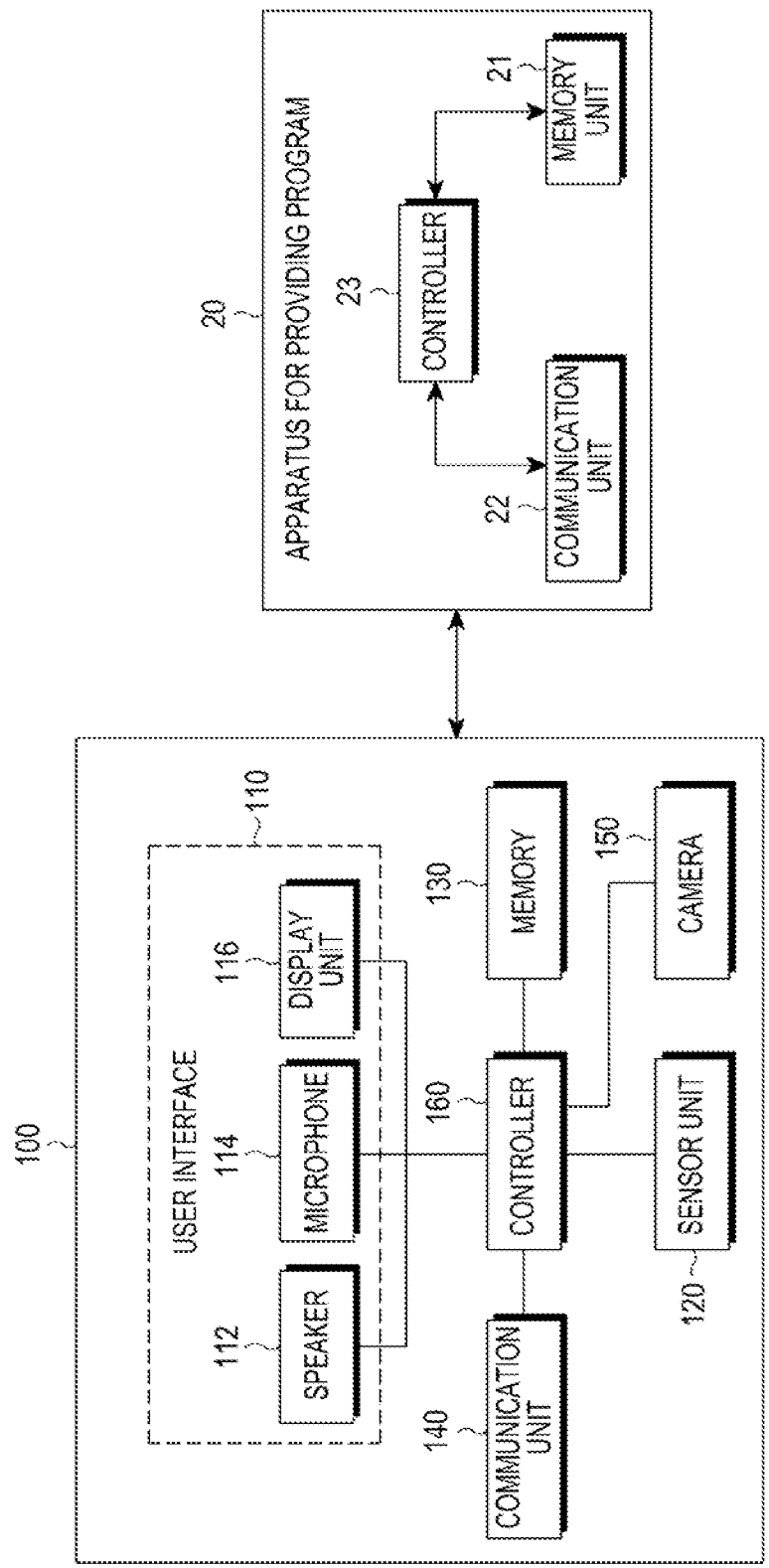
FIG. 1 is a block diagram illustrating the configuration of a communication terminal, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

FIG. 1 is a block diagram illustrating a configuration of a communication terminal, according to an embodiment of the present invention. A communication terminal 100 may be embodied as a portable terminal, such as a smart phone, a mobile phone, a game console, a laptop computer, a tablet Personal Computer (PC), a Personal Media Player (PMP) and a Personal Digital Assistant (PDA), a television (TV), a display device, a head unit for a vehicle, etc.

The communication terminal 100 includes a user interface 110, which includes a speaker 112, a microphone 114 and a display unit 116. The communication terminal also includes a sensor unit 120, a memory 130, a communication unit 140, a camera 150, and a controller 160. The communication terminal 100 may further include a keypad including multiple buttons, a connector, a mouse, etc.

The speaker 112 outputs a voice signal (or voice data), which is input from the controller 160, to the outside. The microphone 114 detects a voice of a user as an electrical voice signal, and outputs the electrical voice signal to the controller 160.

The display unit 116 may display an image based on an image signal which is input from the controller 160, and simultaneously, may receive user input data and may output the user input data to the controller 160. The display unit 116 may be embodied as a Liquid Crystal Display (LCD), an Organic Light Emitting Diode (OLED), or a Light Emitting Diode (LED). The display unit 116 may also include a touch panel disposed below or above the display unit. The touch panel senses user input. When a user input means (for example, a finger or a stylus) presses the surface of the display unit 116, the touch panel outputs a sensing signal (or touch sensing signal) having information on an input position (or input coordinates) and/or an input state (mouse down, mouse up, mouse movement, or the like). For example, the user touches various executable items displayed on a screen of the display unit 116 (namely, the surface of the display unit 116), and executes an application related to the item. The display unit 116 is a means for receiving input from the user. The display unit 116 also outputs screen images related to applications, such as, for example, a self-image capturing application in which the user captures an image of the user by using the camera 150, a camera application, a video phone call application which is used to transmit an image of the user captured by the camera 150 to a portable terminal of the other party and in which the user is talking on the phone while the user views an image of the other party, and a mirror application for displaying an image of the user captured by the camera 150 on the display unit 116 like a mirror. A touch screen including the display unit and the touch panel may serve as an example of the display unit 116. However, the display unit 116 may also be implemented as a conventional display unit.

The sensor unit 120, which is a sensor for sensing the location, bearing and movement of the communication terminal 100, includes at least one of an acceleration sensor, a gravity sensor, a shock sensor, a Global Positioning System (GPS) and a compass sensor.

The memory 130 stores an operating system of the communication terminal 100, various applications thereof, information, data, a file and the like, which are input to the communication terminal 100, and information, data, a file, and the like, which are generated within the communication terminal 100.

The communication unit 140 transmits a message, data, a file and the like, which are generated by the controller 160, by wire or wirelessly, or receives a message, data, a file and the like, by wire or wirelessly, and outputs them to the controller 160.

The camera 150 may include a lens system, an image sensor, and a flash. The camera converts a light signal, which is input (or captured) through the lens system, to an electrical image signal, and outputs the electrical image signal to the controller 160. The user may capture a moving image or a still image through the camera 150.

The lens system forms an image of the subject by causing light incident from the outside to converge. The lens system includes at least one lens, and lenses include a convex lens, an aspheric lens, etc. The lens system has symmetry with respect to an optical axis passing through the center of the lens system, and the optical axis is defined as a central axis. The image sensor detects an optical image formed by external light incident through the lens system, as an electrical image signal. The image sensor includes multiple pixel units arranged in the structure of an M×N matrix, and the pixel unit may include a photo diode and multiple transistors. The pixel unit accumulates a charge generated by incident light, and a voltage according to the accumulated charges represents the illuminance of the incident light. When processing a still image or one image included in a moving image file, an image signal output from the image sensor is formed by a set of voltages (namely, pixel values) which are output from the pixel units, and the image signal represents one frame (namely, a still image). The frame includes M×N pixels. The image sensor may be embodied as a Charge-Coupled Device (CCD) image sensor, a Complementary Metal-Oxide Semiconductor (CMOS) image sensor.

The controller 160, which is a Central Processing Unit (CPU), serves to control an overall operation of the communication terminal 100, and serves to perform a method for correcting a gaze direction according to an embodiment of the present invention.

An apparatus 20 for providing a program includes: a memory unit 21 for storing a program including instructions causing the communication terminal 100 to perform the method for correcting a gaze direction, update information of the program, and the like; a communication unit 22 for performing wired or wireless communication with the communication terminal 100; and a controller 23 for transmitting the relevant program or the update information to the communication terminal 100 at the request of the communication terminal 100 or automatically.

Figure 2:
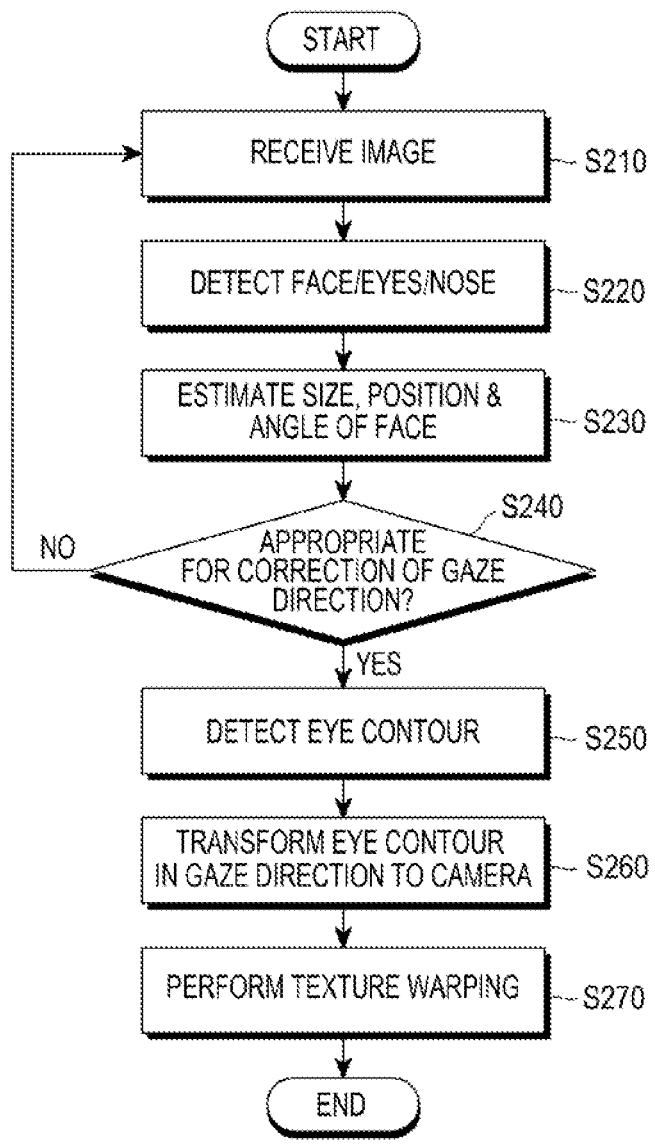
FIG. 2 is a flowchart illustrating a method for correcting a gaze direction, according to an embodiment of the present invention.

FIG. 2 is a flowchart illustrating a method for correcting a gaze direction, according to an embodiment of the present invention.

In step S210, the controller 160 receives an image frame from the camera 150, or reads an image frame stored in the memory 130. Although this method is described on a per image frame basis, this method may also be applied to each sequentially input or read image frame. This method may also be performed on an image input in real time from the camera while the communication terminal 100 performs a one-to-one video call or a multilateral video conference. Otherwise, this method may be performed on an image which is input in real time from the camera in different application modes, such as, for example, a self-image capturing application and a mirror application.

In step S220, the controller 160 detects a face, eyes and a nose from the image frame. In an embodiment of the present invention, the detection of the nose as well as the face and the eyes is described for illustrative purposes. However, because embodiments of the present invention relate to the correction of a gaze direction, detection of the nose or coordinates of the nose may be omitted.

The controller 160 determines whether a face image is included in the image frame. When the face image is included in the image frame, the controller 160 extracts the relevant face image. Herein, the face may be detected by a conventional method for detecting a face, and specifically, may be detected by using a technology for extracting a face, which uses a contour of a face, the color and/or texture of facial skin, a template, etc. For example, the controller 160 may learn each face through multiple face images, and may detect the face image from the input image frame by using accumulated face learning data.

Figure 3:
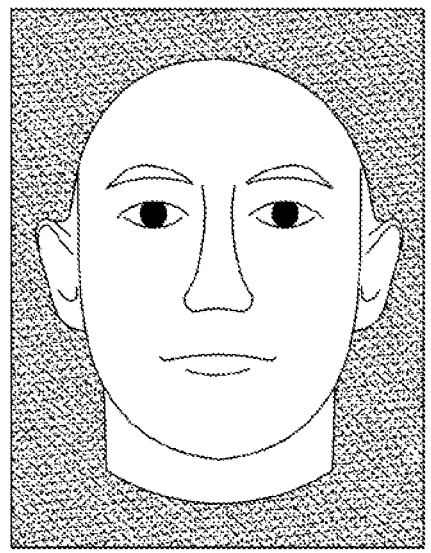
FIG. 3 is a diagram illustrating a detected face image, according to an embodiment of the present invention.

FIG. 3 is a diagram illustrating a detected face image, according to an embodiment of the present invention.

The controller 160 detects information on the eyes and the nose. The detection of the eyes and the nose may be accomplished by using the face learning data described above. The controller 160 detects center coordinates of each of the left eye and the right eye, and center coordinates of the nose. The center coordinates of each eye may be X and Y axis coordinates of a center point of the pupil, and the center coordinates of the nose may be X and Y axis coordinates of the tip of the nose.

In order to stabilize the performance of the correction of a gaze direction, the controller 160 may perform a process for readjusting eye detection information and nose detection information. When eyes and a nose are detected from each image frame, a large change in the position of eyes and that of a nose may appear in adjacent frames. Specifically, when points corresponding to coordinates of the detected eyes and coordinates of the detected nose are displayed over sequential frames on the display unit 116, an unstable shaking phenomenon on the display unit 116 may occur. This phenomenon may affect the detection of an outer edge of each eye and the estimation of the angle and/or slope of the face. As a result, there occurs a phenomenon in which the eyes, having a corrected gaze direction, shake.

Figure 4:
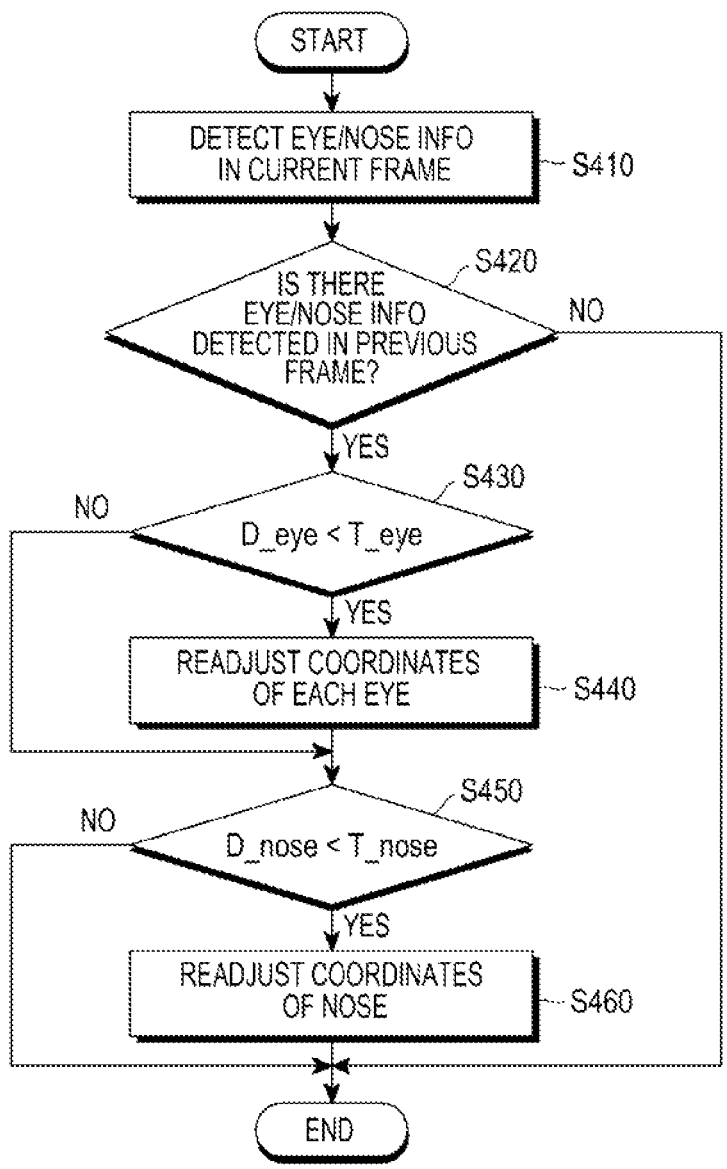
FIG. 4 is a flowchart illustrating a process for readjusting eye detection information and nose detection information, according to an embodiment of the present invention.

FIG. 4 is a flowchart illustrating a process for readjusting eye detection information and nose detection information, according to an embodiment of the present invention. When coordinates are not readjusted in this process, coordinates of each eye and those of the nose in the current frame are used as they are.

In step S410, the controller 160 detects coordinates of each eye and those of the nose in the current frame.

In step S420, the controller 160 determines whether coordinates of each eye and those of the nose that have been detected in a previous frame are stored in the memory 130. When the coordinates of each eye and those of the nose in the previous frame do not exist, this process is completed.

When the coordinates of each eye and those of the nose in the previous frame exist, the controller 160 compares a difference D_EYE between coordinates of each eye in the previous frame and those of each eye in the current frame with a previously-set threshold T_eye, in step S430. Step S430 is performed on each of the left and right eyes. When D_eye is less than T_eye, step S440 is performed. In contrast, when D_eye is greater than or equal to T_eye, step S450 is performed.

In step S440, the controller 160 readjusts the coordinates of each eye in the current frame.

In step S450, the controller 160 compares a difference D_nose between coordinates of the nose in the previous frame and those of the nose in the current frame with a previously-set threshold T_nose. When D_nose is less than T_nose, step S460 is performed. In contrast, when D_nose is greater than or equal to T_nose, this process is completed.

In step S460, the controller 160 readjusts the coordinates of the nose in the current frame.

In steps S440 and S460, coordinates of each eye and coordinates of the nose may be readjusted as shown in Equation (1) below. In the steps for readjusting coordinates, coordinates in the current frame are changed to coordinates located between coordinates in the previous frame and the coordinates in the current frame.

$$Final\_LeftEyeX = ALPHA*Curr\_LeftEyeX+(1-ALPHA)*Prev\_LeftEyeX$$

$$Final\_LeftEyeY = ALPHA*Curr\_LeftEyeY+(1-ALPHA)*Prev\_LeftEyeY$$

$$Final\_RightEyeX = ALPHA*Curr\_RightEyeX+(1-ALPHA)*Prev\_RightEyeX$$

$$Final\_RightEyeY = ALPHA*Curr\_RightEyeY+(1-ALPHA)*Prev\_RightEyeY$$

$$Final\_NoseX = ALPHA*Curr\_NoseX+(1-ALPHA)*Prev\_NoseX$$

$$Final\_NoseY = ALPHA*Curr\_NoseY+(1-ALPHA)*Prev\_NoseY \quad (1)$$

ALPHA represents a weight, Final_LeftEyeX and Final_LeftEyeY represent final X and Y axis coordinates of the left eye, Final_RightEyeX and Final_RightEyeY represent final X and Y axis coordinates of the right eye, Curr_LeftEyeX and Curr_LeftEyeY represent X and Y axis coordinates of the left eye detected in the current frame, Curr_RightEyeX and Curr_RightEyeY represent X and Y axis coordinates of the right eye detected in the current frame, Pre_LeftEyeX and Pre_LeftEyeY represent X and Y axis coordinates of the left eye detected in the previous frame, and Pre_RightEyeX and Pre_RightEyeY represent X and Y axis coordinates of the right eye detected in the previous frame. Also, Final_NoseX and Final_NoseY represent final X and Y axis coordinates of the nose, Curr_NoseX and Curr_NoseY represent coordinates of the nose detected in the current frame, and Prev_NoseX and Prev_NoseY represent coordinates of the nose detected in the previous frame.

The determination of a weight ALPHA used to readjust eye detection information and nose detection information may be defined based on coordinates of the detected eyes and coordinates of the detected nose and may be used, by the user. The readjustment of coordinates as described above may be applied not only to the eye detection information and the nose detection information, but also to face detection information and mouth detection information. For example, by setting a weight ALPHA to 0.5, the previous frame and the current frame are all given an identical weight. Also, a weight ALPHA to the left eye, a weight ALPHA to the right eye, and a weight ALPHA to the nose may be determined so as to be dynamically changed according to D_left, D_right, D_nose, T_eye and T_nose, as shown in Equation (2) below.

ALPHA_LeftEye=D_left/T_eye

ALPHA_RightEye=D_right/T_eye

ALPHA_Nose=D_nose/T_nose (2)

Referring back to FIG. 2, in step S230, the controller 160 estimates the size, position and angle of the face by using coordinate information of the detected face, eyes and nose.

The controller 160 may first detect a gaze direction of the face (or an angle thereof) and/or a slope thereof, and may then determine whether the detected face image looks straight ahead, to the left, to the right, upwards, downwards, or in a diagonal direction (towards the upper left, towards the upper right, towards the lower left, or towards the lower right). For example, the controller 160 may learn each face through face images of various angles, and may detect an angle of the face or a gaze direction thereof from the input image frame by using accumulated face learning data.

When a gaze direction is corrected in real time, the failure and success of detection of the face/eyes/nose frequently alternate with each other, depending on the proportion of the face in a screen image, the position of the face, and the angle/slope of the face. The execution and non-execution of the correction of a gaze direction alternate with each other, so that there occurs a phenomenon in which the eyes appear to blink. In order to solve this problem, the controller 160 may determine whether it is appropriate to correct a gaze direction, in step S240 of FIG. 2.

In order to determine whether it is appropriate to correct a gaze direction, the controller 160 determines whether the following conditions are met. Specifically, the controller 160 performs at least one of the following three steps, and thereby, may determine whether it is appropriate to correct a gaze direction.

Figure 5:
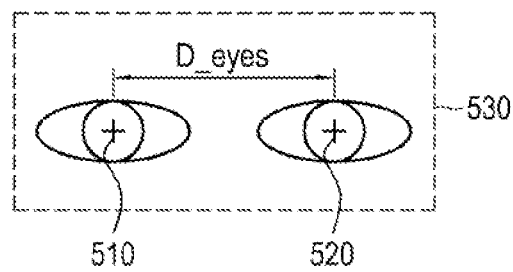
FIG. 5 is a diagram illustrating a determination of whether it is appropriate to correct a gaze direction, according to an embodiment of the present invention.

FIG. 5 is a diagram illustrating a step of determining whether it is appropriate to correct a gaze direction, according to an embodiment of the present invention.

Firstly, only when the next condition depending on the size of the face is met, is a gaze direction is corrected. When a distance D_eyes between center coordinates 510 of the left eye and center coordinates 520 of the right eye is less than or equal to a previously-set threshold T_size, a gaze direction is corrected. In contrast, when D_eyes is greater than T_size, a gaze direction is corrected until the detection of the face/eyes/nose fails. After the detection of the face/eyes/nose fails, a gaze direction is not corrected until D_eyes becomes less than or equal to T_size. When D_eyes is greater than T_size and the detection of the face/eyes/nose fails, a face area guide (or guide area) 530 suitable for correcting a gaze direction may be displayed on the display unit 116, or a message may be displayed thereon.

Secondly, as a condition depending on the position of the face, when the coordinates 510 and 520 of both eyes are located within the guide area with the previously-determined guide area 530 enabling the detection of the face/eyes/nose as reference, a gaze direction is corrected. In contrast, when the coordinates 510 and 520 of both eyes are located outside the guide area, a gaze direction is corrected until the detection of the face/eyes/nose fails. Then, after the detection of the face/eyes/nose fails, a gaze direction is not corrected until the coordinates 510 and 520 of both eyes lie within the guide area 530.

Thirdly, after a slope is estimated by using the coordinates 510 and 520 of both eyes, namely, when an angle that a virtual line segment connecting the coordinates 510 and 520 of both eyes forms with the X axis on the screen is less than or equal to a previously-determined slope, a gaze direction is not corrected. When the angle is greater than the previously-determined slope, a gaze direction is corrected until the detection of the face/eyes/nose fails, whereas a gaze direction is not corrected until the slope of both eyes becomes less than or equal to a determined slope. As in all cases, after the detection of the face/eyes/nose fails, the face area guide 530 suitable for correcting a gaze direction or the X axis may be displayed on the display unit 116, or a message may be displayed thereon.

Referring back to FIG. 2, in step S250, the controller 160 detects a contour of each eye (namely, an eye area), using coordinates of each of the finally detected eyes as a reference. Step S250 sets a point having the largest change in the brightness value of a pixel in the direction of a vector passing through each contour point of a previously-set eye model from the center coordinates of the eye area, as a contour point of the eye area.

A technology for eye model-based contour extraction may be used to detect an accurate contour of each eye. Learning data of various eye shapes is used to generate an eye model. An N number of points are defined on a contour of each eye for an image of the learning data, and an eye model is generated through primary component analysis by using the defined points. Illumination correction is applied to an eye area obtained by detecting each eye in order to minimize the effect that light has on the area. An Active Shape Model (ASM) is applied in such a manner that a mean shape of eye models is located in the illumination-corrected eye area and center coordinates of each eye and an end point thereof are set as initial points. The end point of each eye is defined as a ⅕ point closer to a relevant pupil with respect to a distance between the relevant pupil and the other pupil. After the initial points are selected, a search is made for a point having the largest change in the brightness value of a pixel in the direction of a normal vector of each of an N number of points included in the mean shape of eye models (namely, in the direction of a vector connecting the center coordinates with each point of the eye model). A curve connecting an N number of points, each having the largest change in the brightness value of a pixel, as described above is defined as a contour of each eye.

Figure 6:
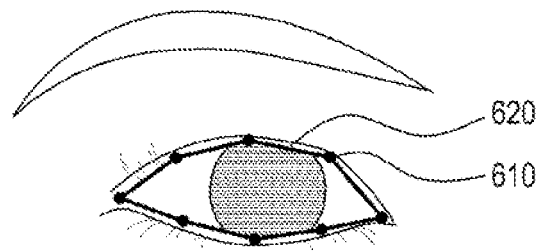
FIG. 6 is a diagram illustrating a contour of a detected eye, according to an embodiment of the present invention.

FIG. 6 is a diagram illustrating a contour of a detected eye. As shown in FIG. 6, a contour 620 of a detected eye is defined as a curve connecting eight contour points 610.

Just as the coordinates of each eye and those of the nose are readjusted in order to minimize shaking of the corrected gaze direction eyes, so a readjustment process may be performed on an N number of points determining the contour of the detected eye by using contour information obtained in the previous frame. An example of readjustment is as follows. A movement distance Di (i=1, 2, 3, . . . , N) between points matched with each other and a mean movement distance DM are calculated with respect to an N number of points determining the contour obtained in the previous frame and an N number of points obtained in the current frame. When the mean movement distance is less than or equal to a previously-determined threshold T_contour, weights are given to coordinate information in the previous frame and coordinate information in the current frame, and coordinates of each point are readjusted. When the mean movement distance is greater than the previously-determined threshold T_contour, contour information obtained in the current frame is used as it is. A weight used to readjust coordinates of each point may use a fixed value as in the case of readjusting coordinates of each eye and those of the nose. Otherwise, numerical values, which are dynamically determined by using coordinate information of the face/eyes/nose, Di and DM, may be used. Also, when points determining a contour of each eye are extracted, a phenomenon in which some points are erroneously extracted, may occur. In order to prevent these errors, a method may be used in which a large weight is given to each point in the previous frame with respect to each point, a movement distance of which is greater than the mean movement distance calculated in relation to the points in the previous frame.

Referring again to FIG. 2, in step S260, the controller 160 transforms the contour of the detected eye into a contour thereof in a direction of the eyes gazing at the camera. Namely, the controller 160 changes the contour points in the eye area in the current frame to contour points in a previously-set gaze direction to a reference camera. The controller 160 should change the contour points defining the contour of the detected eye, based on the difference between the gaze direction of the face (namely, the angle or slope of the face) of the user in the current frame and the previously-set gaze direction to the reference camera (namely, the angle or slope of the face). Specifically, in order to generate eyes having a shape such that they look at the camera 150, the controller 160 moves at least some of the detected contour points so as to be matched with contour points of a previously-stored eye area that gazes straight ahead. As a method for moving contour points, a transformation function for changing an eye shape by using data of eyes looking at the display unit 116 and learning data of eyes looking at the camera 150 may be generated and used. For example, an affine transformation function for transforming contour points of an eye of the data looking at the display unit 116 into contour points of an eye of the data looking at the camera may be generated and used. Otherwise, contour points of an upper part of each eye may be separated from contour points of a lower part thereof, and thereby, two affine transformation functions may be generated and used. As another example, an affine transformation function for contour points of an upper part of an eye may be generated from the learning data and then the contour points thereof may be transformed by using the affine transformation function. After a straight line connecting an inner end point of each eye with an outer end point thereof is obtained, a contour of a lower part of the eye may be converted to a contour having a shape approaching this straight line. Otherwise, the user may adjust the movement range the contour points of the upper part of each eye along the Y axis, and thereby, may adjust the size of each of the eyes, the gaze direction of which has been corrected.

Figure 7:
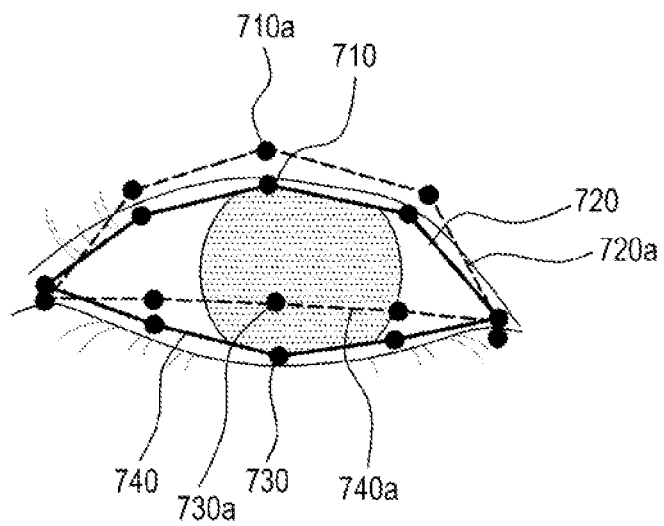
FIG. 7 is a diagram illustrating a transformation of a contour of an eye, according to an embodiment of the present invention.

FIG. 7 is a diagram illustrating the transformation of a contour of an eye, according to an embodiment of the present invention. FIG. 7 illustrates points 710*a* of a new contour 720*a* of the upper part of the eye obtained by moving points 710 of a detected contour 720 of the upper part of the eye upwards according to the affine transformation function. Also, FIG. 7 illustrates points 730*a* of a new contour 740*a* of the lower part of the eye obtained by moving points 730 of a contour 740 of the lower part of the eye upwards according to a straight line function.

Referring back to FIG. 2, in step S270, the controller 160 performs texture warping on the eye area according to the transformed eye contour. Specifically, the controller 160 performs texture mapping on the eye area by using a forward warping technology or a backward warping technology.

The shape of the eyes, the gaze direction of which has been corrected, may be obtained only after this texture warping is performed. Use may be made of both forward warping for performing mapping with each point of an eye area as reference before warping, and backward warping for performing mapping with each point of an eye area as reference after warping. These warping techniques are conventional ones, and are not described in detail herein. During the forward warping, a hole is generated that is not filled with texture. In this case, the forward warping is performed in parallel with a process for filling the hole by using nearby texture information. Because a hole is not generated during the backward warping, it is desirable to use the backward warping method.

Figures 8A, 8B:
FIGS. 8A and 8B are diagrams illustrating the shape of eyes transformed by texture warping, according to an embodiment of the present invention.

FIGS. 8A and 8B are diagrams illustrating the shape of eyes, which are transformed by texture warping, according to an embodiment of the present invention. FIG. 8A illustrates the shape of the eyes before being transformed, and FIG. 8B illustrates that of the eyes after being transformed.

In embodiments of the present invention, an oval mask or an oval area may be used to reduce processing time required for warping and solve artificiality around the frame of the glasses appearing when the warping is performed on a person who wears glasses.

Figure 9:
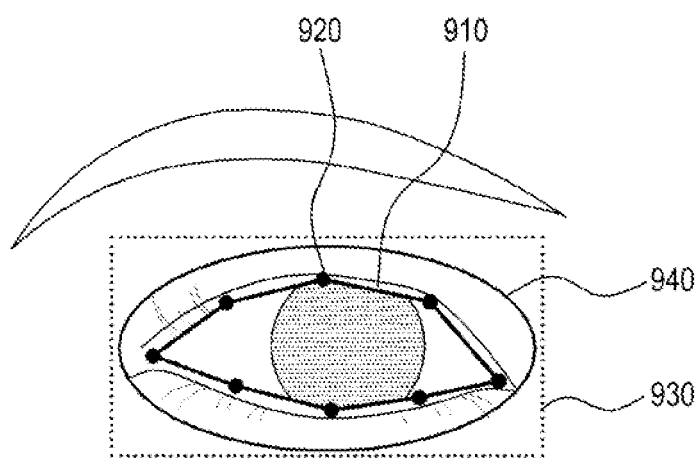
FIG. 9 is a diagram illustrating an oval mask used in texture warping, according to an embodiment of the present invention.

FIG. 9 is a diagram illustrating an oval mask used in texture warping. An oval mask 940 is generated within a rectangular window 930 including all points 920 of an eye contour 910. Warping is performed within the oval mask 940. Also, after the warping is performed, in order to solve the artificiality of an oval boundary part, an oval boundary area may be blurred.

Figure 10:
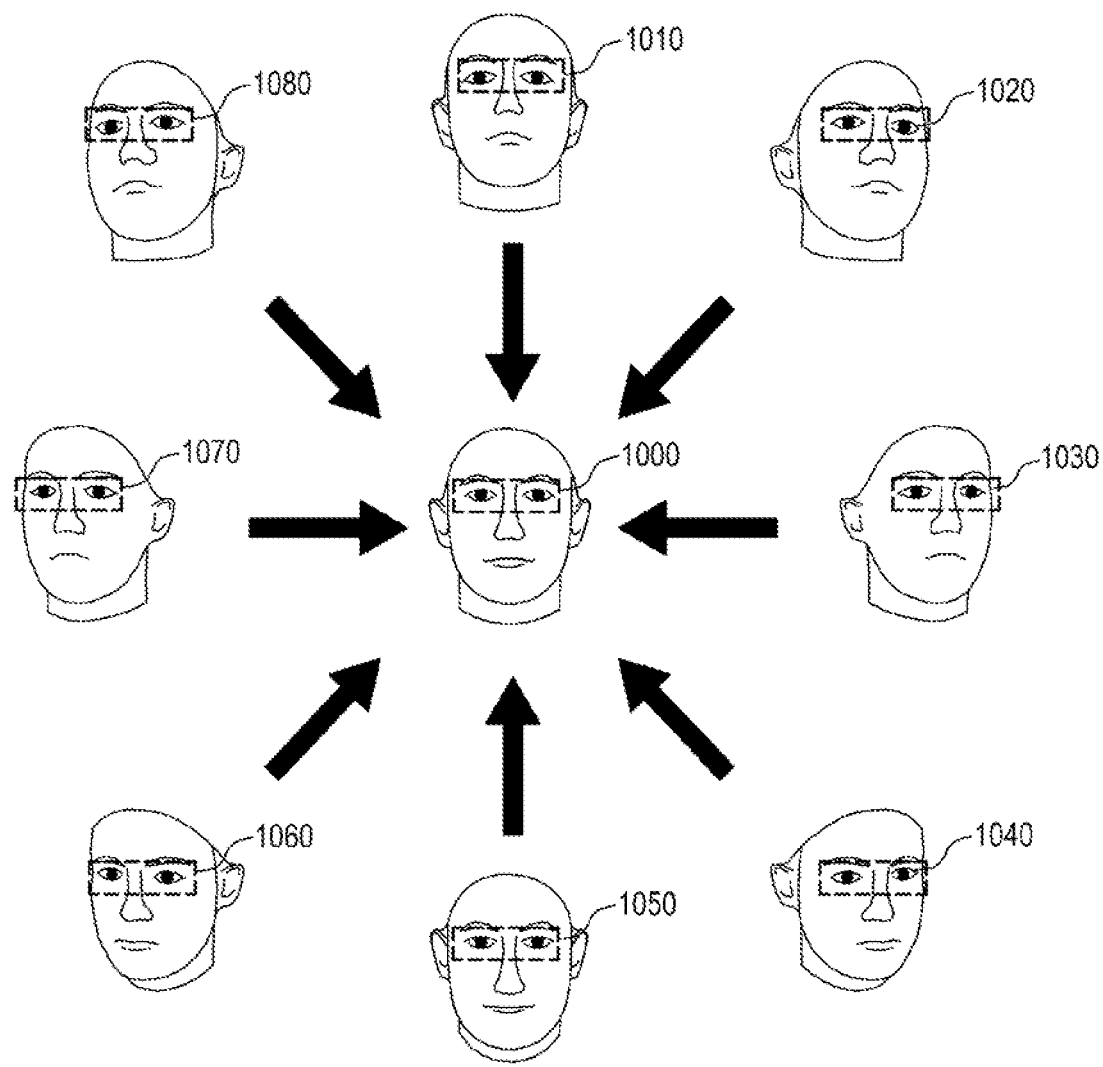
FIG. 10 is a diagram illustrating the effect of a method for correcting a gaze direction, according to an embodiment of the present invention.

FIG. 10 is a diagram illustrating the effect of a method for correcting a gaze direction, according to an embodiment of the present invention. According to the correction of a gaze direction, for example, from the viewpoint of the user, eyes 1010 looking upwards, eyes 1020 looking towards the upper left, eyes 1030 looking to the left, eyes 1040 looking towards the lower left, eyes 1050 looking downwards, eyes 1060 looking towards the lower right, eyes 1070 looking to the right, and eyes 1080 looking towards the upper right are all transformed into eyes 1000 looking straight ahead. Namely, the eyes gazing at the display unit are transformed into the eyes gazing at the camera. The overall shape of the face, the angle thereof and the slope thereof are not transformed, but only the shape of the eyes is transformed.

In embodiments of the present invention, it is possible to correct a gaze direction of a user in an image in real time or at high speed in all application technologies, where disparity in the gaze direction of the user is caused by the difference between the gaze direction of the user to a display unit and that of the user to a camera, by using a single camera mounted to an electronic apparatus without adding a separate camera or sensor, in electronic apparatuses having both a storage medium of limited capacity and limited calculation processing capability. Embodiments of the present invention have an effect that an eye contact between users or conferees not only enables them to focus on a conversation but also increases the convenience during a video phone call and during a video conference. Also, embodiments of the present invention provides an effect in which it appears as if the user is actually looking into a mirror in a mirror function. Also, the present invention provides an advantage in that it provides the convenience of enabling the user to capture an image while viewing a face image of himself/herself displayed on the display unit, without raising the portable communication terminal and capturing an image while looking at the camera, in order to capture a good image of himself/herself in self-image capturing.

It will be appreciated that the embodiments of the present invention may be implemented in the form of hardware, software, or a combination of hardware and software. Any such software may be stored in a volatile or non-volatile storage device, such as a Read-Only Memory (ROM), or in a memory such as a Random Access Memory (RAM), a memory chip, a memory device or a memory integrated circuit, or in a storage medium, such as a Compact Disc (CD), a Digital Versatile Disc (DVD), a magnetic disk or a magnetic tape, which is optically or magnetically recordable and simultaneously, is readable by a machine, regardless of whether the software can be deleted or rewritten. It will be appreciated that a memory is an example of a storage medium readable by a machine (for example, a computer) suitable for storing a program or programs including instructions for implementing the embodiments of the present invention. Accordingly, embodiments of the present invention include a program that includes a code for implementing a method claimed in any claim of this specification, and a machine-readable storage medium for storing this program. Also, this program may be electronically conveyed via any medium such as a communication signal transmitted through a wired or wireless connection, and embodiments of the present invention suitably includes equivalents of this program.

The portable terminal may receive the program from the apparatus for providing a program, to which the portable terminal is connected by wire or wirelessly, and may store the received program. The apparatus for providing a program may include: a memory unit for storing a program including instructions causing the portable terminal to perform a method for correcting a gaze direction of the user in a previously-set image, information necessary for the method for correcting the gaze direction of the user in the image, and the like; a communication unit for performing wired or wireless communication with the portable terminal; and a controller for transmitting the relevant program to the portable terminal at the request of the portable terminal or automatically.

While the present invention has been shown and described with reference to certain embodiments thereof, it will be understood by those skilled in the art that various changes in form and detail may be made therein without departing from the spirit and scope of the present invention. Therefore, the spirit and scope of the present invention is not limited to the described embodiments thereof, but is defined by the appended claims and equivalents thereof.

What is claimed is:

1. A method for correcting a gaze direction of a user in an image captured by a camera, the method comprising the steps of:
    detecting a face of the user in the captured image;
    detecting contour points of an eye area in the detected face, the eye area being defined by an eye contour connecting the contour points;
    changing the contour points of the detected eye area in the captured image to contour points corresponding to a gaze direction toward the camera by moving at least some of the detected contour points; and
    correcting the gaze direction of the user in the captured image by transforming the eye area according to a changed eye contour which connects the changed contour points,
    wherein detecting the contour points of the eye area in the detected face comprises setting a point having a largest change in a brightness value of a pixel in a direction of a vector passing through a contour point of a previously-set eye model, as a contour point of the eye area.

2. The method as claimed in claim 1, wherein detecting the face of the user in the captured image comprises:
    comparing a preset threshold with a difference between coordinates of each eye in a previous frame and coordinates of each eye in a current frame; and
    adjusting the coordinates of each eye in the current frame when the difference is less than the threshold.

3. The method as claimed in claim 2, wherein adjusting the coordinates of each eye comprises changing the coordinates of each eye in the current frame to coordinates located between the coordinates of each eye in the previous frame and the coordinates of each eye in the current frame.

4. The method as claimed in claim 1, wherein changing the contour points comprises changing at least some of the detected contour points to contour points of a previously-stored eye area that gazes in the direction toward the camera.

5. The method as claimed in claim 1, wherein transforming the eye area comprises performing texture mapping on the eye area by using a forward warping technology or a backward warping technology.

6. The method as claimed in claim 5, wherein the texture mapping is performed within an oval mask including the changed contour points of the eye area.

7. The method as claimed in claim 1, further comprising:
    determining whether it is appropriate to correct the gaze direction by performing at least one of:
    determining whether a distance between both eyes in the captured image is less than or equal to a previously-set threshold;
    determining whether both eyes are located in a previously-set guide area; and
    determining whether a slope of the detected face, which is measured by using coordinates of both eyes, is less than or equal to a previously-set slope.

8. An article of manufacture for correcting a gaze direction of a user in an image captured by a camera, comprising a non-transitory machine-readable storage medium for recording one or more programs, which when executed implement the steps of:
    detecting a face of the user in the captured image;
    detecting contour points of an eye area in the detected face, the eye area being defined by an eye contour connecting the contour points;
    changing the contour points of the detected eye area in the captured image to contour points corresponding to a gaze direction toward the camera by moving at least some of the detected contour points; and
    correcting the gaze direction of the user in the captured image by transforming the eye area according to a changed eye contour which connects the changed contour points,
    wherein detecting the contour points of the eye area in the detected face comprises setting a point having a largest change in a brightness value of a pixel in a direction of a vector passing through a contour point of a previously-set eye model, as a contour point of the eye area.

9. A portable terminal for correcting a gaze direction of a user in an image, the portable terminal comprising:
    a camera for capturing an image;
    a processor for detecting a face of the user in the captured image, detecting contour points of an eye area in the detected face, the eye area being defined by an eye contour connecting the contour points, changing the contour points of the detected eye area in the captured image to contour points corresponding to a gaze direction toward the camera by moving at least some of the detected contour points, and correcting the gaze direction of the user in the captured image by transforming the eye area according to a changed eye contour which connects the changed contour points; and a display for displaying the captured image in which the eye area is transformed by the processor, wherein the processor sets a point having a largest change in a brightness value of a pixel in a direction of a vector passing through a contour point of a previously-set eye model, as a contour point of the eye area.

10. The portable terminal as claimed in claim 9, wherein the processor compares a preset threshold with a difference between coordinates of each eye in a previous frame and coordinates of each eye in a current frame, and adjusts the coordinates of each eye in the current frame when the difference is less than the threshold.

11. The portable terminal as claimed in claim 10, wherein the processor changes the coordinates of each eye in the current frame to coordinates located between the coordinates of each eye in the previous frame and the coordinates of each eye in the current frame.

12. The portable terminal as claimed in claim 9, wherein the gaze direction toward the reference camera corresponds to a straight-ahead gaze direction.

13. The portable terminal as claimed in claim 9, wherein the processor changes at least some of the detected contour points to contour points of a previously-stored eye area that gazes in the direction toward the camera.

14. The portable terminal as claimed in claim 9, wherein the processor performs texture mapping on the eye area by using a forward warping technology or a backward warping technology.

15. The portable terminal as claimed in claim 14, wherein the texture mapping is performed within an oval mask including the changed contour points of the eye area.

16. The portable terminal as claimed in claim 9, wherein the processor determines whether it is appropriate to correct the gaze direction by performing at least one of:

determining whether a distance between both eyes in the captured image is less than or equal to a previously-set threshold;

determining whether both eyes are located in a previously-set guide area; and determining whether a slope of the detected face, which is measured by using coordinates of both eyes, is less than or equal to a previously-set slope.

17. The portable terminal as claimed in claim 9, wherein the processor changes the contour points based on a difference between a gaze direction of the face of the user in the captured image and the gaze direction toward the camera, which is previously set as a reference.

18. The portable terminal as claimed in claim 9, wherein the image is captured while a self-image capturing application, a video phone call application or a mirror application is executed.

* * * * *